US010528439B2

(12) United States Patent
Ahn

(10) Patent No.: US 10,528,439 B2
(45) Date of Patent: Jan. 7, 2020

(54) MEMORY APPARATUS, MEMORY MODULE AND SEMICONDUCTOR SYSTEM CAPABLE OF DYNAMIC MIRRORING

(71) Applicant: SK hynix Inc., Icheon-si Gyeonggi-do (KR)

(72) Inventor: Nam Young Ahn, Seoul (KR)

(73) Assignee: SK hynix Inc., Icheon-si Gyeonggi-do (KR)

( * ) Notice: Subject to any disclaimer, the term of this patent is extended or adjusted under 35 U.S.C. 154(b) by 155 days.

(21) Appl. No.: 15/675,421

(22) Filed: Aug. 11, 2017

(65) Prior Publication Data
US 2018/0189153 A1 Jul. 5, 2018

(30) Foreign Application Priority Data

Jan. 5, 2017 (KR) .................. 10-2017-0001723

(51) Int. Cl.
*G06F 11/20* (2006.01)
*G06F 12/02* (2006.01)
G06F 12/0888 (2016.01)
G06F 11/16 (2006.01)

(52) U.S. Cl.
CPC ...... *G06F 11/2071* (2013.01); *G06F 11/2017* (2013.01); *G06F 11/2089* (2013.01); *G06F 12/0284* (2013.01); *G06F 11/1666* (2013.01); *G06F 12/0888* (2013.01); *G06F 2212/1032* (2013.01)

(58) Field of Classification Search
CPC .............. G06F 3/0688; G06F 11/2056; G06F 11/2071; G06F 11/2089
USPC ........................................ 714/6.23
See application file for complete search history.

(56) References Cited

U.S. PATENT DOCUMENTS

| 7,194,568 | B2 | 3/2007 | Jeter et al. | |
| 7,694,093 | B2 * | 4/2010 | Shaw | G06F 11/1658 711/105 |
| 8,601,310 | B2 * | 12/2013 | Dreier | G06F 11/1666 714/6.1 |
| 8,738,976 | B2 * | 5/2014 | Nakano | G11C 5/00 714/719 |
| 8,898,408 | B2 * | 11/2014 | Berke | G06F 11/1048 711/162 |
| 2009/0216985 | A1 | 8/2009 | O'Connor et al. | |

* cited by examiner

*Primary Examiner* — Joseph R Kudirka
(74) *Attorney, Agent, or Firm* — William Park & Associates Ltd.

(57) ABSTRACT

A semiconductor system may include a host, a memory controller and a memory apparatus. The host may generate a mirror request when a program requiring a mirroring operation is executed. The memory controller may generate mirror information based on the mirror request. The memory apparatus may dynamically perform the mirroring operation based on the mirror information.

12 Claims, 6 Drawing Sheets

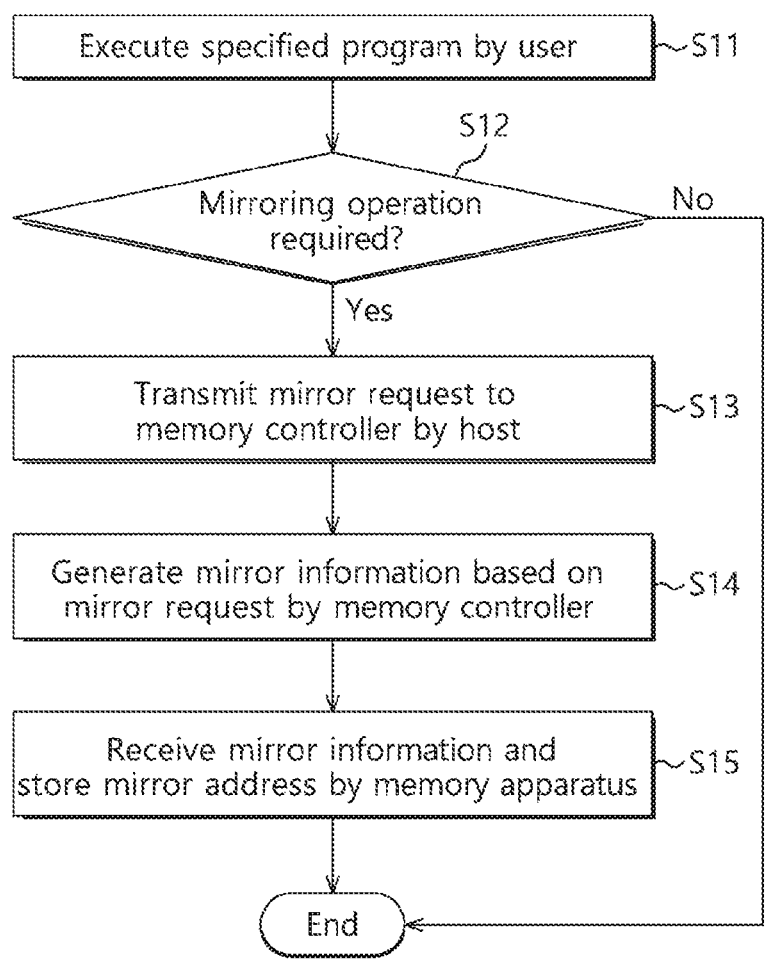

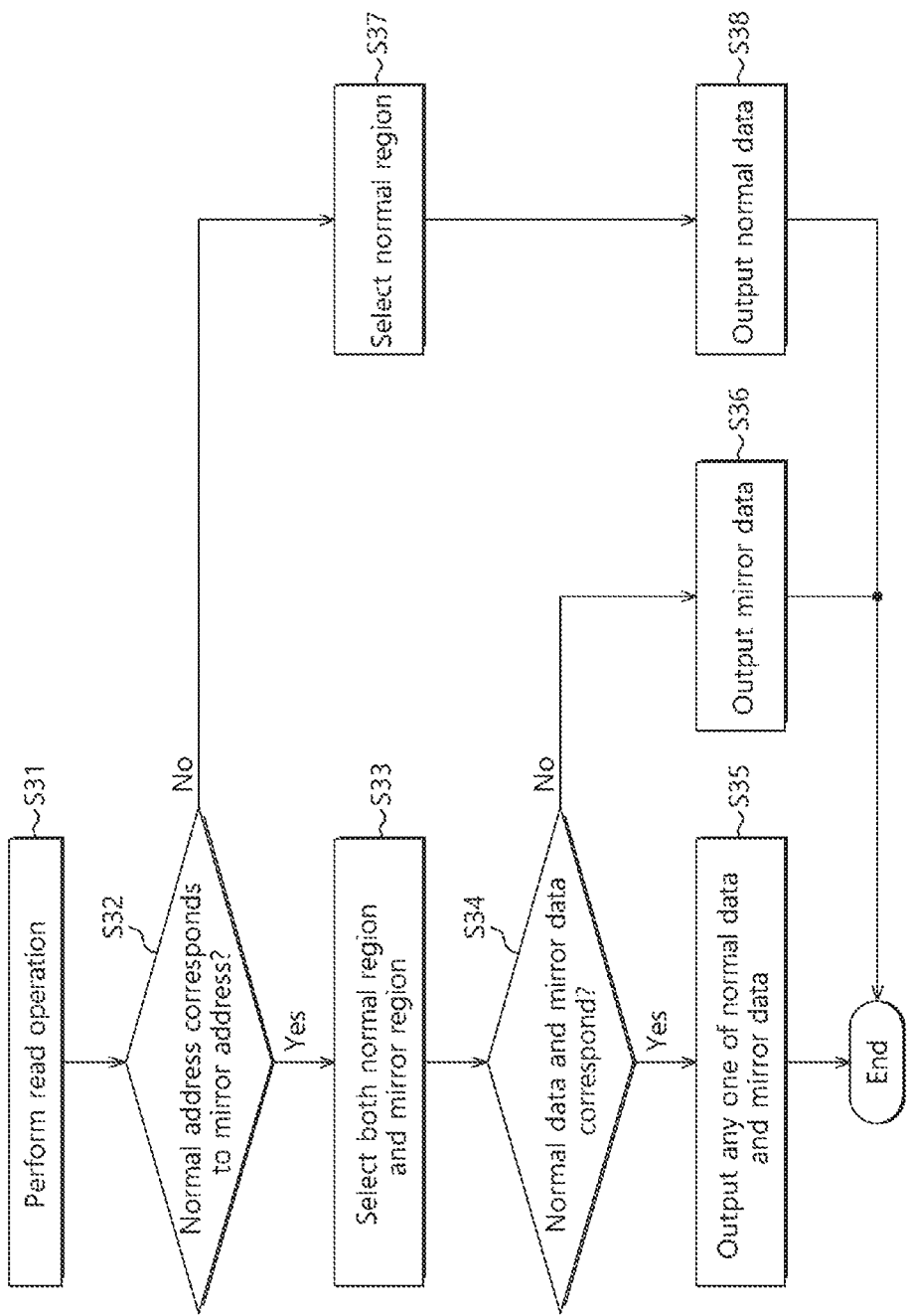

MEMORY APPARATUS, MEMORY MODULE AND SEMICONDUCTOR SYSTEM CAPABLE OF DYNAMIC MIRRORING

CROSS-REFERENCES TO RELATED APPLICATION

The present application claims priority under 35 U.S.C. § 119(a) to Korean application number 10-2017-0001723, filed on Jan. 5, 2017, in the Korean Intellectual Property Office, which is incorporated herein by reference in its entirety.

BACKGROUND

1. Technical Field

Various embodiments generally relate to a semiconductor technology, and, more particularly, to a memory apparatus, a memory module, and a system.

2. Related Art

In a typical computer device, a processor and memory are mounted onto a main board including signal transmission lines, and are configured to perform data communications. In the memory, a plurality of memory apparatuses may be configured in a module type and may be mounted onto the main board. In order to prevent data from being lost due to a failure or an error likely to occur in the memory apparatuses, a mirroring operation may be performed. The mirroring operation may be performed by redundantly storing important data.

SUMMARY

In an embodiment, a semiconductor system may include: a host configured to generate a mirror request when a program requiring a mirroring operation is executed; a memory controller configured to generate mirror information based on the mirror request; and a memory apparatus configured to store data in at least one of a normal region and a mirror region based on the mirror information.

In an embodiment, a semiconductor system may include: a memory controller configured to generate mirror information according to a mirror request; and a memory apparatus configured to perform a mirroring operation based on the mirror information, the memory apparatus including a mirror controller configured to store a mirror address by receiving the mirror information, and generate a mirror control signal by comparing a normal address and the mirror address; and a data input/output block configured to provide data to at least one of a normal region and a mirror region based on the mirror control signal in a write operation, and output one of normal data outputted from the normal region and mirror data outputted from the mirror region to the memory controller in a read operation.

BRIEF DESCRIPTION OF THE DRAWINGS

FIGS. 3A to 3C are representations of examples of flow charts to assist in an explanation of operations of the semiconductor apparatus and the semiconductor system in accordance with the embodiments.

DETAILED DESCRIPTION

Hereinafter, a memory apparatus, a memory module and a semiconductor system capable of dynamic mirroring will be described below with reference to the accompanying drawings through various examples of embodiments.

Figure 1:
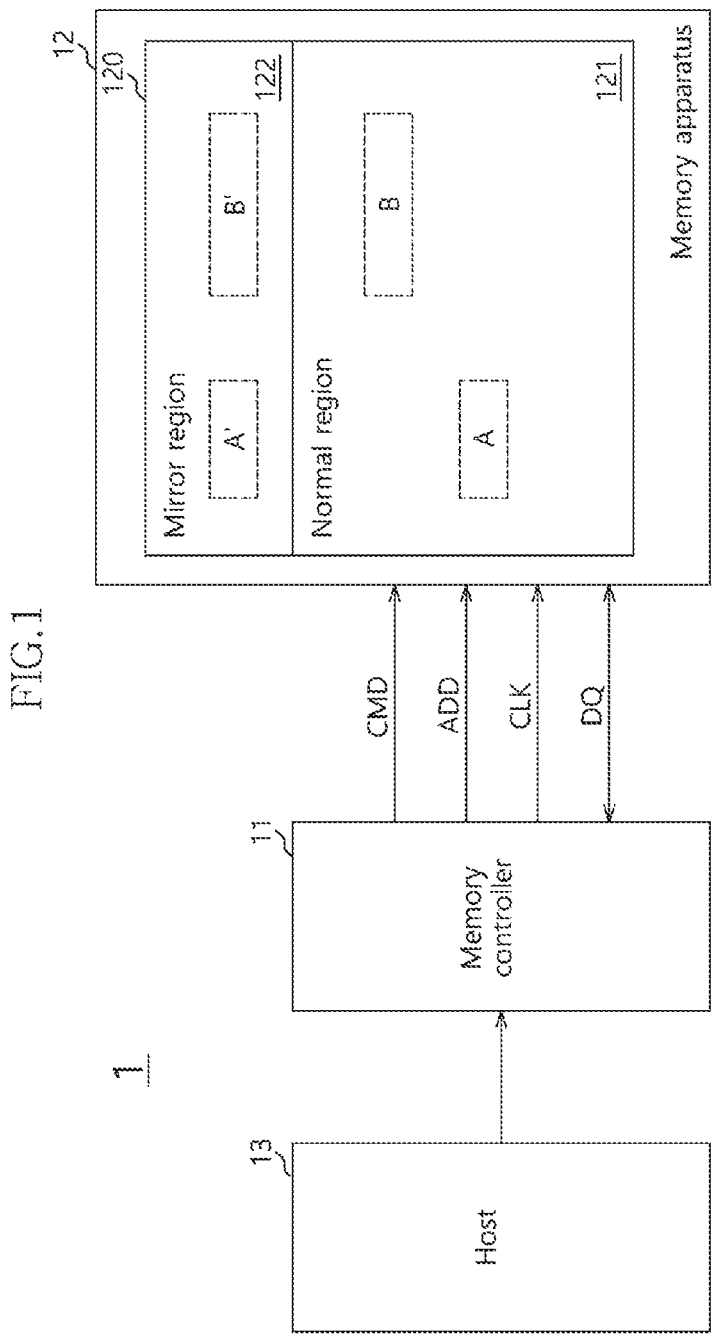
FIG. 1 is a diagram illustrating a representation of an example configuration of a semiconductor system in accordance with an embodiment.

FIG. 1 is a diagram illustrating a representation of an example configuration of a semiconductor system 1 in accordance with an embodiment. In FIG. 1, the semiconductor system 1 may include a memory controller 11 and a memory apparatus 12. The memory controller 11 may control the memory apparatus 12 by being controlled by an external device such as a host 13 such that the memory apparatus 12 may perform various operations. The memory controller 11 may receive various requests from the host 13, and provide various signals to the memory apparatus 12 according to the requests. The memory controller 11 may be coupled with the memory apparatus 12 through a plurality of signal transmission lines, buses, or channels. For example, the memory controller 11 may provide a command signal CMD, an address signal ADD, a clock signal CLK, and data DQ to the memory apparatus 12 through the plurality of signal transmission lines. The memory controller 11 may perform data communications with the memory apparatus 12. For example, an operation in which data DQ transmitted from the memory controller 11 is stored in the memory apparatus 12 may be referred to as a write operation, and an operation in which data DQ stored in the memory apparatus 12 is transmitted to the memory controller 11 may be referred to as a read operation.

The memory controller 11 may receive a write request and a read request from the host 13, and provide or receive various signals to or from the memory apparatus 12. For example, in a write operation, the memory controller 11 may transmit the command signal CMD, the address signal ADD, the clock signal CLK, and the data DQ to the memory apparatus 12. The command signal CMD transmitted from the memory controller 11 to the memory apparatus 12 in the write operation may be a write command signal. In a read operation, the memory controller 11 may transmit the command signal CMD, the address signal ADD, and the clock signal CLK to the memory apparatus 12, and receive the data DQ from the memory apparatus 12. The command signal CMD transmitted from the memory controller 11 to the memory apparatus 12 in the read operation may be a read command signal.

In the present embodiment, the memory controller 11 may receive a mirror request from the host 13 when a program requiring a mirror operation is executed, and may generate and provide mirror information based on the mirror request to the memory apparatus 12. The memory controller 11 may provide the mirror information to the memory apparatus 12 when transmitting a specified command signal to the memory apparatus 12. For example, the specified command signal may be a refresh command signal. When a refresh operation is performed, some signal transmission lines may not be used. Therefore, the memory controller 11 may provide the mirror information to the memory apparatus 12 through signal transmission lines which are usable when transmitting the specified command signal. For example, the memory controller 11 may provide the mirror information as the address signal ADD. While it is illustrated that the specified command signal is a refresh command signal, it is not intended that the embodiment is limited thereto. The mirror information may be transmitted even when a certain operation in which some signal transmission lines are not used as in the refresh operation is performed.

The mirror information may include various information. For example, the mirror information may include information on whether to perform a mirroring operation and information on a mirror address. The information on a mirror address may include a start address and an end address which may be required by the mirroring operation. The information on a mirror address may specify the size of data which is required by the mirroring operation or the size of a space in which the data is stored. The information on a mirror address may include, for example, bank address information, row address information, and column address information.

The memory apparatus 12 may store data DQ transmitted from the memory controller 11, and output data stored therein, to the memory controller 11, as data DQ. The memory apparatus 12 may receive the command signal CMD, the address signal ADD, and the clock signal CLK from the memory controller 11, and perform the write operation and the read operation. In the write operation, the memory apparatus 12 may store the data DQ transmitted from the memory controller 11. In the read operation, the memory apparatus 12 may output data stored in the memory apparatus 12 to the memory controller 11.

The memory apparatus 12 may include a data storage region 120. While not shown, the data storage region 120 may include a plurality of memory banks, and each of the plurality of memory banks may include a plurality of memory cells. The data storage region 120 may include a normal region 121 and a mirror region 122. The size of the mirror region 122 may be smaller than the size of the normal region 121. The normal region 121 may be a data storage region in which normal data is stored, and the mirror region 122 may be a data storage region in which mirror data is stored. Without limiting the disclosure, the mirror region 122 may be a part of one memory bank or may be provided in more than one memory bank.

The memory apparatus 12 may receive the mirror information from the memory controller 11, and dynamically perform a mirroring operation based on the mirror information. The memory apparatus 12 may store a mirror address based on the mirror information. The mirror address may include, for example, address information on the normal region 121 in which important data is stored and address information on the mirror region 122 corresponding to the normal region 121 in which the important data is stored. The mirror address may include address information on a specified region of the normal region 121 and address information on a specified region of the mirror region 122. In FIG. 1, regions indicated by A and B may be specified regions of the normal region 121 for storing important data requiring mirroring, and regions indicated by A' and B' may be specified regions of the mirror region 122 corresponding to the regions indicated by A and B.

The memory apparatus 12 may store the data DQ transmitted from the memory controller 11 in at least one of the normal region 121 and the mirror region 122, based on the mirror information. In a write operation, the memory apparatus 12 may perform a mirroring operation by comparing a normal address transmitted from the memory controller 11 and the mirror address. For example, when the normal address and the mirror address correspond to each other, the memory apparatus 12 may store the data DQ transmitted from the memory controller 11 in both the normal region 121 and the mirror region 122. When the normal address is different from the mirror address, the memory apparatus 12 may store the data DQ transmitted from the memory controller 11 in the normal region 121. For example, when the normal address corresponds to the mirror address, the memory apparatus 12 may store the data DQ in the specified regions A and B of the normal region 121, and may also store the data DQ in the specified regions A' and B' of the mirror region 122. Further, in a read operation, the memory apparatus 12 may output one of normal data outputted from the normal region 121 and mirror data outputted from the mirror region 122, to the memory controller 11. For example, in a read operation when the normal data and the mirror data are different from each other, the memory apparatus 12 may output the mirror data from the mirror region 122, to the memory controller 11, as the data DQ. When the normal data and the mirror data correspond to each other in a read operation, the memory apparatus 12 may output any one of the normal data and the mirror data to the memory controller 11.

The memory apparatus 12 may include a volatile memory apparatus or a nonvolatile memory apparatus. The volatile memory apparatus may include an SRAM (static RAM), a DRAM (dynamic RAM), or an SDRAM (synchronous DRAM), and the nonvolatile memory apparatus may include a ROM (read only memory), a PROM (programmable ROM), an EEPROM (electrically erasable and programmable ROM), an EPROM (electrically programmable ROM), a flash memory, a PRAM (phase change RAM), an MRAM (magnetic RAM), an RRAM (resistive RAM), or an FRAM (ferroelectric RAM).

Figure 2:
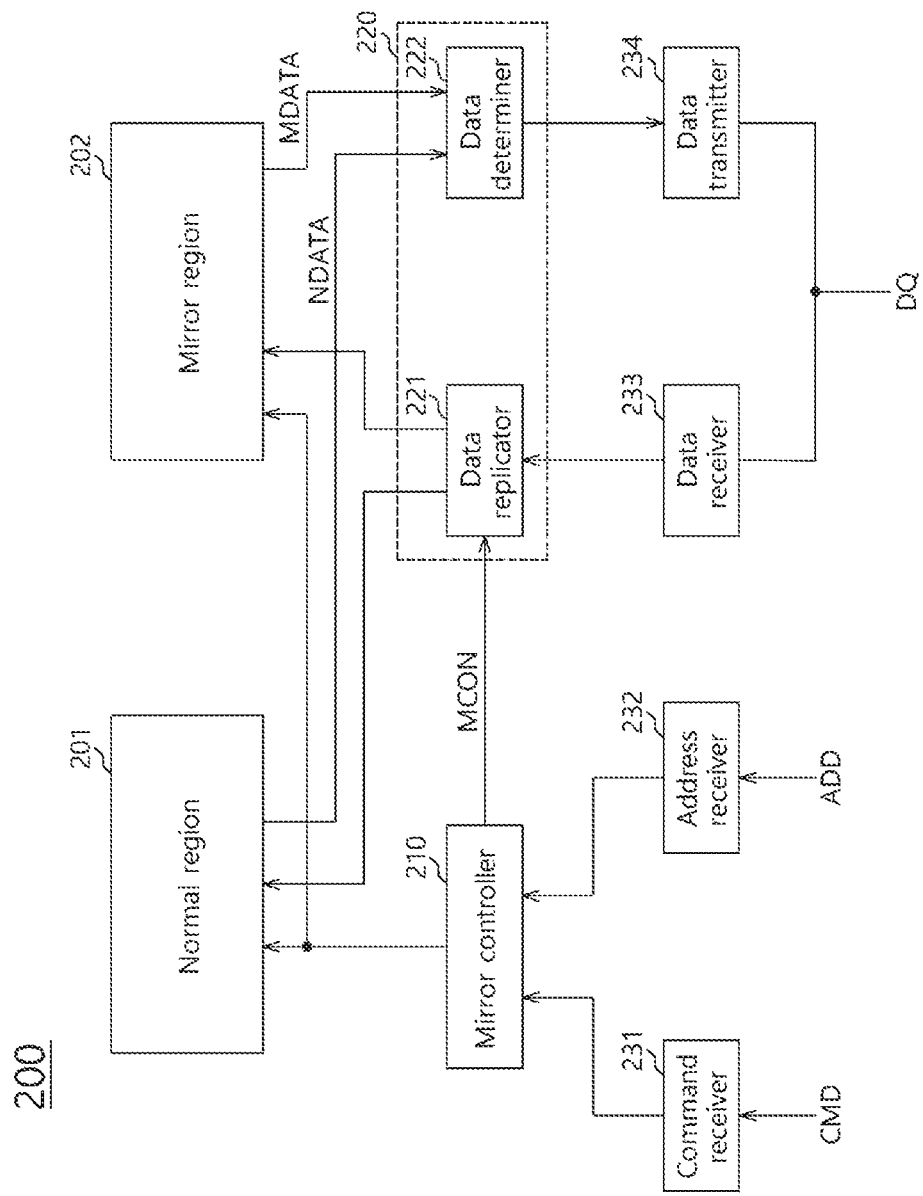
FIG. 2 is a diagram illustrating a representation of an example configuration of a semiconductor apparatus in accordance with an embodiment.

FIG. 2 is a diagram illustrating a representation of an example configuration of a memory apparatus 200 in accordance with an embodiment. The memory apparatus 200 may be applied as the memory apparatus 12 of FIG. 1. In FIG. 2, the memory apparatus 200 may include a normal region 201 and a mirror region 202 which comprise a data storage region. While it is illustrated in FIG. 2 for the sake of convenience and clarity in explanation that the normal region 201 and the mirror region 202 are separated from each other, in some embodiments the normal region 201 and the mirror region 202 may be adjacent to or adjoin each other. The memory apparatus 200 may include a mirror controller 210 and a data input/output block 220. The mirror controller 210 may store a mirror address by receiving mirror information, and generate a mirror control signal MCON by comparing a normal address and the mirror address. The mirror information may be transmitted from an external device, for example, such as the memory controller 11 shown in FIG. 1. The memory controller 11 may provide the mirror information to the memory apparatus 200 as an address signal ADD when transmitting a specified command signal CMD. The normal address may be an address signal ADD which is transmitted from the memory controller 11 when the memory apparatus 200 performs a write operation or a read operation. The mirror controller 210 may enable the mirror control signal MCON when the normal address and the mirror address correspond to each other, and disable the mirror control signal MCON when the normal address and the mirror address are different from each other. The mirror controller 210 may select at least one of the normal region 201 and the mirror region 202 by comparing the normal address and the mirror address. The mirror controller 210 may select both the normal region 201 and the mirror region 202 when the normal address and the mirror address correspond to each other, and select the normal region 201 when the normal address and the mirror address are different from each other. The mirror controller 210 may select a specified region, for example, a specified word line and bit line of a specified memory bank, corresponding to the normal address, in the normal region 201. Similarly, the mirror controller 210 may select a specified region, for example, a specified word line and bit line of a specified memory bank, corresponding to the mirror address, in the mirror region 202.

The data input/output block 220 may perform input and output operations of data DQ in a write operation and a read operation. In a write operation, the data input/output block 220 may provide the data DQ transmitted from the memory controller 11 to at least one of the normal region 201 and the mirror region 202, based on the mirror control signal MCON. In a read operation, the data input/output block 220 may output one of normal data NDATA outputted from the normal region 201 and mirror data MDATA outputted from the mirror region 202, to the memory controller 11, as the data DQ. When the normal data NDATA and the mirror data MDATA are outputted together from the normal region 201 and the mirror region 202, the data input/output block 220 may compare the normal data NDATA and the mirror data MDATA. The data input/output block 220 may output the mirror data MDATA as the data DQ when the normal data NDATA and the mirror data MDATA are different from each other.

The data input/output block 220 may include a data replicator 221 and a data determiner 222. The data replicator 221 may receive the mirror control signal MCON. In the write operation, the data replicator 221 may provide the data DQ to at least one of the normal region 201 and the mirror region 202, based on the mirror control signal MCON. For example, the data replicator 221 may provide the data DQ to both the normal region 201 and the mirror region 202 when the mirror control signal MCON is enabled, and provide the data DQ to the normal region 201 when the mirror control signal MCON is disabled.

In the read operation, the data determiner 222 may determine whether the normal data NDATA and the mirror data MDATA correspond to each other, and output one of the normal data NDATA and the mirror data MDATA to the memory controller 11. The data determiner 222 may output the normal data NDATA as data DQ to the memory controller 11 if only the normal data NDATA is received in the read operation. The data determiner 222 may compare the normal data NDATA and the mirror data MDATA when both the normal data NDATA and the mirror data MDATA are received in the read operation. The data determiner 222 may output any one of the normal data NDATA and the mirror data MDATA to the memory controller 11 as the data DQ when the normal data NDATA and the mirror data MDATA correspond to each other. For example, the data determiner 222 may output the normal data NDATA as the data DQ when the normal data NDATA and the mirror data MDATA correspond to each other. The data determiner 222 may output the mirror data MDATA to the memory controller 11 as the data DQ when the normal data NDATA and the mirror data MDATA are different from each other. In an embodiment, the data determiner 222 may output correct data between the normal data NDATA and the mirror data MDATA as the data DQ when the normal data NDATA and the mirror data MDATA are different from each other. For example, the data determiner 222 may determine which data of the normal data NDATA and the mirror data MDATA is correct data, by communicating with the memory controller 11.

The memory apparatus 200 may further include a command receiver 231, an address receiver 232, a data receiver 233, and a data transmitter 234. The command receiver 231 may receive a command signal CMD which is transmitted from the memory controller 11, and provide the received command signal to the mirror controller 210. The address receiver 232 may receive an address signal ADD which is transmitted from the memory controller 11, and provide the received address signal to the mirror controller 210. The data receiver 233 may receive the data DQ which is transmitted from the memory controller 11, and provide the received data to the data input/output block 220. The data receiver 233 may be coupled with the data replicator 221. The data transmitter 234 may be coupled with the data input/output block 220, and transmit the data DQ outputted from the memory apparatus 200, to the memory controller 11. The data transmitter 234 may be coupled with the data determiner 222.

Figure 3B:
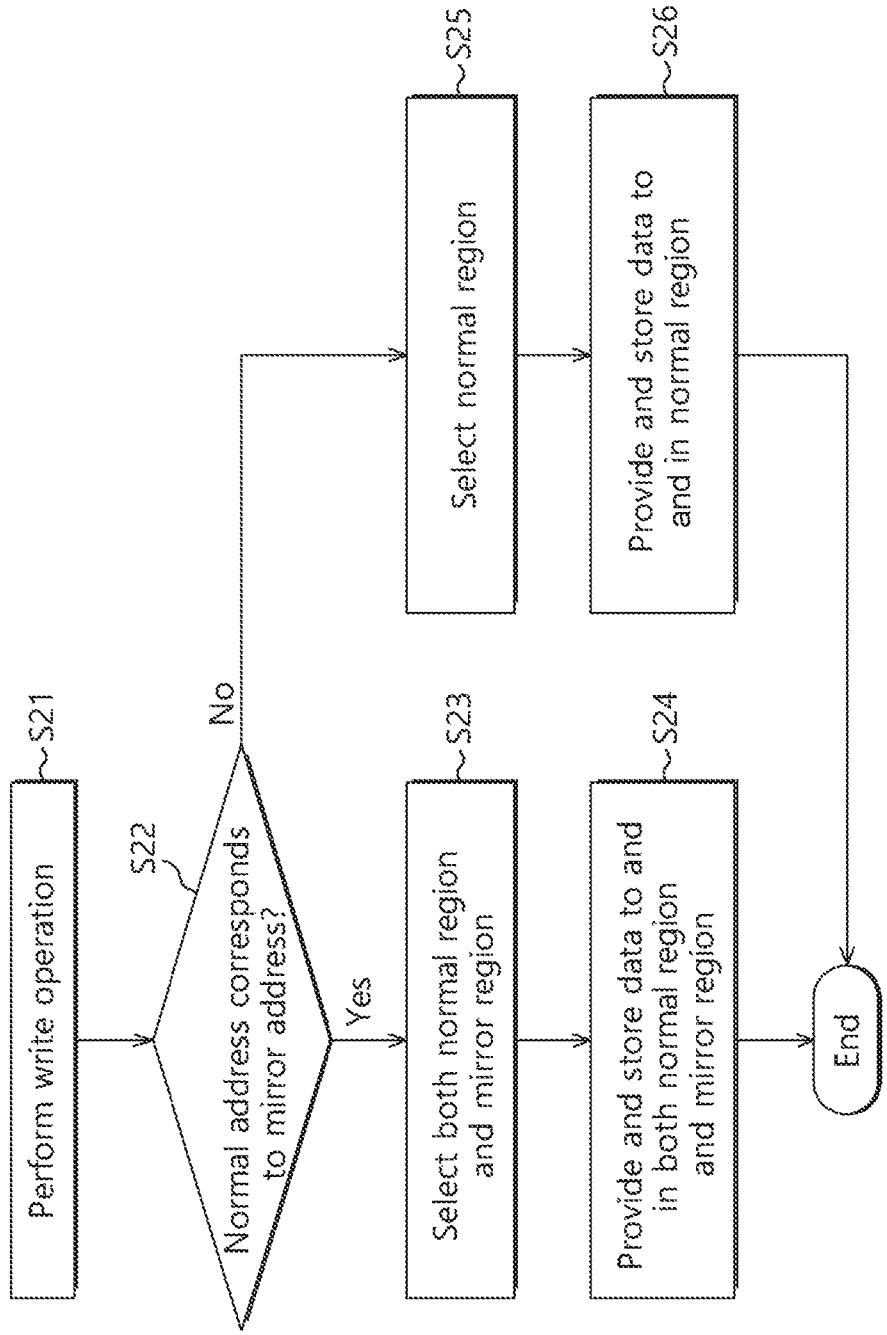

FIGS. 3a, 3b, and 3c are representations of example flow charts to assist in the explanation of operations of the memory apparatus 200 and the semiconductor system 1 in accordance with the embodiments. Operations of the memory apparatus 200 and the semiconductor system 1 in accordance with the embodiments will be described below with reference to FIGS. 1 to 3c. FIG. 3a is a flow chart showing a process of setting mirror information for dynamic mirroring of the memory apparatus 200. Referring to FIG. 3a, if a user executes a certain program (S11), the host 13 may determine whether or not the certain program requires a mirroring operation (S12). If the certain program requires a mirroring operation, the host 13 may transmit a mirror request to the memory controller 11 (S13). The memory controller 11 may generate mirror information based on the mirror request (S14), and transmit the mirror information to the memory apparatus 200. The memory controller 11 may provide the mirror information to the memory apparatus 200 as an address signal ADD when transmitting a specified command signal, for example, a refresh command signal. For example, the memory apparatus 200 and the memory controller 11 may be coupled with each other through an address bus, and the address signal ADD may be transmitted through the address bus. Because an address signal ADD need not be transmitted through the address bus in a refresh operation of the memory apparatus 200, the memory controller 11 may transmit the mirror information through the address bus which is not used when transmitting the refresh command signal in the refresh operation. The mirror controller 210 of the memory apparatus 200 may receive the mirror information transmitted as the address signal ADD, and store a mirror address corresponding to the mirror information (S15). Therefore, preparation for the memory apparatus 200 to perform a mirroring operation may be completed. If the certain program does not require a mirroring operation, a preparation for a mirroring operation may not be performed.

Then, a write operation and a read operation may be performed. As shown in FIG. 3b, if a write operation is to be performed (S21), the memory apparatus 200 may receive a command signal CMD, an address signal ADD, and data DQ from the memory controller 11. The command signal CMD may be a write command signal, and the address signal ADD may be a normal address. The mirror controller 210 may compare the normal address and the mirror address (S22). If the normal address corresponds to the mirror address, the data DQ to be stored through the write operation may be important data. The mirror controller 210 may enable the mirror control signal MCON. The mirror controller 210 may select the normal region 201 and the mirror region 202 together based on the normal address and the mirror address (S23). The data replicator 221 may provide the data DQ to both the normal region 201 and the mirror region 202, based on the enabled mirror control signal MCON. Thus, the data DQ may be stored in both the normal region 201 and the mirror region 202 (S24). If the normal address is different from the mirror address, the data DQ to be stored through the write operation may be unimportant data. The mirror controller 210 may disable the mirror control signal MCON. The mirror controller 210 may select the normal region 201 based on the normal address (S25), and does not select the mirror region 202. The data replicator 221 may provide the data DQ to only the normal region 201 based on the disabled mirror control signal MCON, and the data DQ may be stored in the normal region 201 (S26).

As shown in FIG. 3c, if a read operation is to be performed (S31), the memory apparatus 200 may receive a command signal CMD and an address signal ADD from the memory controller 11. The command signal CMD may be a read command signal, and the address signal ADD may be a normal address. The mirror controller 210 may compare the normal address and the mirror address (S32). When the normal address corresponds to the mirror address, the mirror controller 210 may select the normal region 201 and the mirror region 202 (S33) together. Therefore, the normal data NDATA stored in the normal region 201 and the mirror data MDATA stored in the mirror region 202 may be outputted together to the data determiner 222. The data determiner 222 may compare the normal data NDATA and the mirror data MDATA (S34). If the normal data NDATA and the mirror data MDATA correspond to each other, the data determiner 222 may output any one of the normal data NDATA and the mirror data MDATA as the data DQ (S35). If the normal data NDATA and the mirror data MDATA are different from each other, the data determiner 222 may output the mirror data MDATA instead of the normal data NDATA as the data DQ (S36). Returning to step S32, the mirror controller 210 may select only the normal region 201 when the normal address and the mirror address are different from each other (S37). Therefore, the normal data NDATA stored in the normal region 201 is outputted to the data determiner 222, and the data determiner 222 may output the normal data NDATA to the memory controller 11 as the data DQ (S38).

Figure 4:
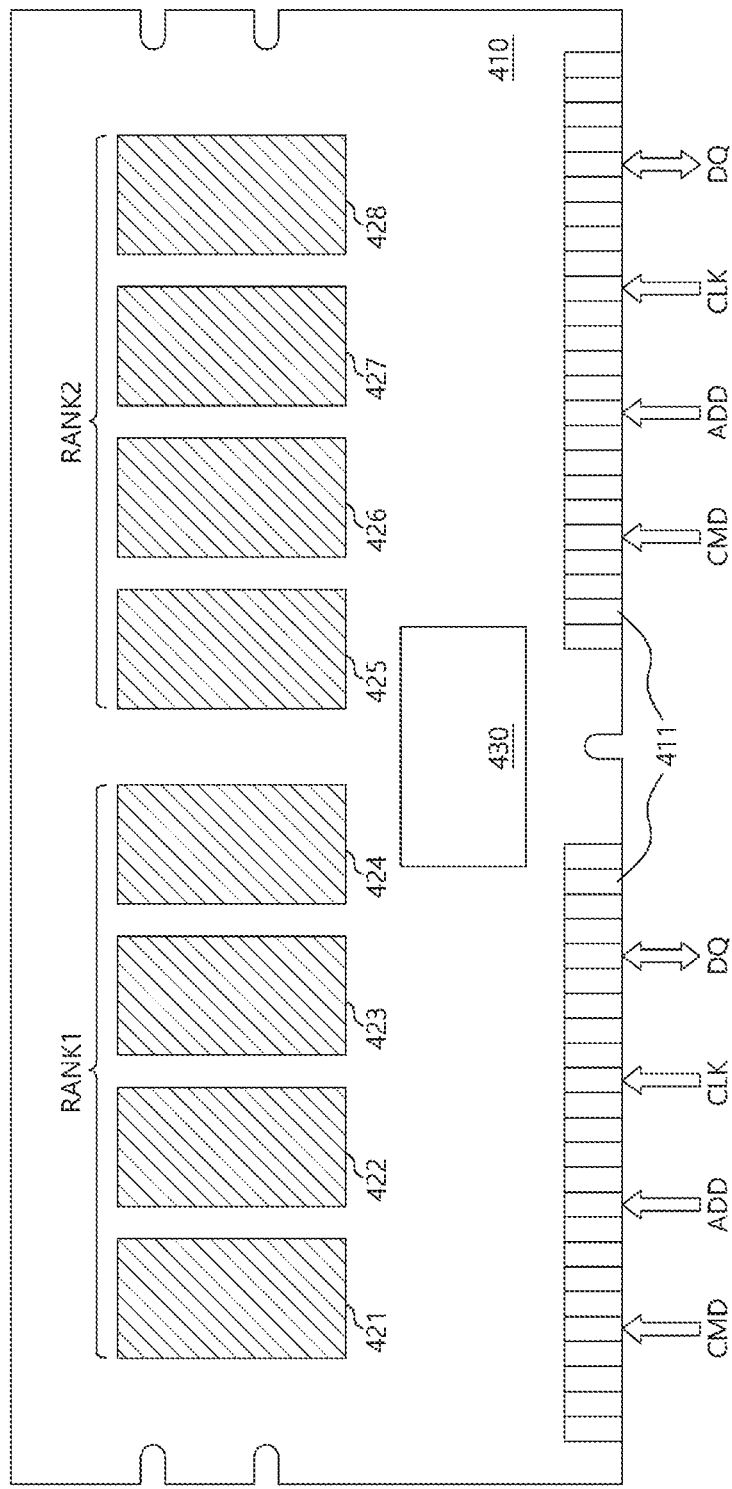
FIG. 4 is a diagram illustrating a representation of an example configuration of a memory module in accordance with an embodiment.

FIG. 4 is a diagram illustrating a representation of an example configuration of a memory module 4 in accordance with an embodiment. The memory module 4 may include a module substrate 410 and a plurality of memory apparatuses 421, 422, 423, 424, 425, 426, 427, and 428. The plurality of memory apparatuses 421, 422, 423, 424, 425, 426, 427, and 428 may be mounted onto the module substrate 410. While it is illustrated in FIG. 4 that eight memory apparatuses are mounted onto the module substrate 410, it is to be noted that the embodiment is not limited thereto. The number of memory apparatuses mounted onto the module substrate 410 may be changed, and other memory apparatuses may be mounted on a backside corresponding to the mounting positions of the illustrated memory apparatuses 421, 422, 423, 424, 425, 426, 427, and 428. Module pins 411 may be formed on the module substrate 410. The module pins 411 may be channels for communicating with an external device such as the memory controller 11 or the host 13 shown in FIG. 1. A command signal CMD, an address signal ADD, and a clock signal CLK may be received through the module pins 411 from the external device, and data DQ may be transmitted and received between the memory module 4 and the external device. The module pins 411 of the memory module 4 may be fitted into a slot (not shown) which is formed in a main board, and thereby, be electrically coupled with the external device. The memory module 4 may be embodied in the form of any one among, for example, a UDIMM (unbuffered dual in-line memory module), a DIMM (dual in-line memory module), an RDIMM (registered dual in-line memory module), an LRDIMM (load-reduced dual in-line memory module), or an SODIMM (small outline dual in-line memory module). Further, the memory module 4 may be a memory module which includes an advanced memory buffer 430 capable of performing functions substantially similar to the memory controller 11 or the host 13.

The memory module 4 may operate as a plurality of ranks. For example, first to fourth memory apparatuses 421, 422, 423, and 424 may be configured as a first rank RANK1, and fifth to eighth memory apparatuses 425, 426, 427, and 428 may be configured as second rank RANK2. Each of the first to eighth memory apparatuses 421, 422, 423, 424, 425, 426, 427, and 428 may include a mirror region. The first rank RANK1 and the second rank RANK2 may perform mirroring operations independently of each other. For example, the first rank RANK1 may perform an operation of storing important data for which a mirroring operation is required, whereas the second rank RANK2 may perform an operation of storing data for which a mirroring operation is not required. Because the memory module 4 is set by the external device such as the memory controller 11 or the host 13 to dynamically perform a mirroring operation, the efficiency of the mirroring operation may be increased, and the reliability of a semiconductor system including the memory module 4 may be improved.

While various embodiments have been described above, it will be understood to those skilled in the art that the embodiments described are examples only. Accordingly, the memory apparatus, the memory module and the semiconductor system capable of dynamic mirroring described herein should not be limited based on the described embodiments.

What is claimed is:
1. A semiconductor system comprising:
a memory controller configured to generate mirror information according to a mirror request; and
a memory apparatus configured to perform a mirroring operation based on the mirror information,
the memory apparatus comprising:
a mirror controller configured to store a mirror address by receiving the mirror information, enable a mirror control signal when a normal address and the mirror address correspond to each other, and disable the mirror control signal when the normal address and the mirror address are different from each other; and
a data input/output block configured to provide data to at least one of a normal region and a mirror region based on the mirror control signal in a write operation, and output one of normal data outputted from the normal region and mirror data outputted from the mirror region to the memory controller in a read operation.

2. The semiconductor system according to claim 1, wherein the memory controller provides the mirror information as an address signal to the memory apparatus when transmitting a specified command signal.

3. The semiconductor system according to claim 2, wherein the specified command signal is a refresh command signal.

4. The semiconductor system according to claim 1, wherein the mirror controller selects the normal region and the mirror region when the normal address and the mirror address correspond to each other.

5. The semiconductor system according to claim 4, wherein the mirror controller selects the normal region when the normal address and the mirror address are different from each other.

6. The semiconductor system according to claim 1, wherein the data input/output block comprises:
   a data replicator circuit suitable for providing the data to at least one of the normal region and the mirror region based on the mirror control signal in the write operation; and
   a data determiner circuit suitable for determining whether the normal data and the mirror data correspond to each other in the read operation, and outputting one of the normal data and the mirror data to the memory controller.

7. The semiconductor system according to claim 6, wherein the data replicator circuit provides the data to the normal region and the mirror region when the mirror control signal is enabled, and provides the data to the normal region when the mirror control signal is disabled.

8. The semiconductor system according to claim 6, wherein the data determiner circuit determines whether the normal data and the mirror data correspond to each other, when both of the normal data and the mirror data are outputted.

9. The semiconductor system according to claim 8, wherein the data determiner circuit outputs the mirror data to the memory controller when the normal data and the mirror data are different from each other.

10. The semiconductor system according to claim 8, wherein the data determiner circuit outputs one of the normal data and the mirror data to the memory controller when the normal data and the mirror data correspond to each other.

11. The semiconductor system according to claim 1, further comprising:
    a command receiver circuit configured to receive a command signal transmitted from the memory controller and provide the received command signal to the mirror controller; and
    an address receiver circuit configured to receive an address signal transmitted from the memory controller and provide the received address signal to the mirror controller.

12. The semiconductor system according to claim 1, further comprising:
    a data receiver circuit configured to receive data transmitted from the memory controller, and provide the received data to the data input/output block; and
    a data transmitter circuit configured to transmit one of the normal data and the mirror data outputted from the data input/output block to the memory controller.

* * * * *